United States Patent
Xu

(10) Patent No.: US 12,256,424 B2
(45) Date of Patent: Mar. 18, 2025

(54) METHOD AND DEVICE FOR INFORMATION TRANSMISSION

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 647 days.

(21) Appl. No.: 17/156,480

(22) Filed: Jan. 22, 2021

(65) Prior Publication Data
US 2021/0144754 A1    May 13, 2021

Related U.S. Application Data

(63) Continuation of application No. PCT/CN2019/097913, filed on Jul. 26, 2019.

(30) Foreign Application Priority Data

Jul. 27, 2018   (CN) .......................... 201810844630.5

(51) Int. Cl.
*H04W 74/00* (2009.01)
*H04L 1/18* (2023.01)
(Continued)

(52) U.S. Cl.
CPC ......... *H04W 74/006* (2013.01); *H04L 1/1812* (2013.01); *H04W 74/0833* (2013.01)

(58) Field of Classification Search
None
See application file for complete search history.

(56) References Cited

U.S. PATENT DOCUMENTS

| | | |
|---|---|---|
| 2013/0083739 A1 | 4/2013 | Yamada |
| 2014/0301330 A1 | 10/2014 | Lee et al. |

(Continued)

FOREIGN PATENT DOCUMENTS

| | | |
|---|---|---|
| CN | 108282899 A | 7/2018 |
| CN | 108282901 A | 7/2018 |

(Continued)

OTHER PUBLICATIONS

ZTE. "Considerations on Channel Access Procedure for NR-U" 3GPP TSG RAN WG2 Meeting #102 R2-1807253, May 11, 2018 (May 11, 2018), section 2.

(Continued)

*Primary Examiner* — Hong Shao
(74) *Attorney, Agent, or Firm* — PERKINS COIE LLP

(57) ABSTRACT

A method for information transmission includes that: a terminal device sends a first preamble and a first uplink data channel to a network device; the terminal device receives first downlink control information from the network device;

(Continued)

---

501 — A terminal device receives first DCI from a network device after sending a first preamble and a first uplink data channel to the network device 502 — The terminal device determines at least one of the following based on a related parameter of the first DCI: a type of a RACH process, a content of the first DCI, a transmission mechanism for first data scheduled by the first DCI, or information carried in the first data scheduled by the first DCI and the terminal device determines at least one of the following based on a related parameter of the first DCI: a type of a random access channel (RACH) process; a content of the first DCI; a transmission mechanism for first data scheduled by the first DCI; or information carried in the first data scheduled by the first DCI. A device for information transmission is also provided.

13 Claims, 4 Drawing Sheets

(51) Int. Cl.
*H04L 1/1812* (2023.01)
*H04W 74/08* (2024.01)
*H04W 74/0833* (2024.01)

(56) References Cited

U.S. PATENT DOCUMENTS

| | | | |
|---|---|---|---|
| 2018/0205516 A1 | 7/2018 | Jung et al. | |
| 2019/0075598 A1* | 3/2019 | Li | H04W 74/0833 |
| 2019/0320467 A1* | 10/2019 | Freda | H04W 74/004 |
| 2019/0327768 A1* | 10/2019 | Kim | H04W 74/006 |
| 2019/0342896 A1* | 11/2019 | Kusashima | H04W 88/02 |
| 2021/0075574 A1 | 3/2021 | Jung et al. | |

FOREIGN PATENT DOCUMENTS

| | | |
|---|---|---|
| CN | 108322936 A | 7/2018 |
| WO | 2018085726 A1 | 5/2018 |
| WO | 2018126365 A1 | 7/2018 |

OTHER PUBLICATIONS

International Search Report in the international application No. PCT/CN2019/097913, mailed on Oct. 12, 2019.
First Office Action of the Chinese application No. 202110396100.0, issued on Aug. 23, 2022. 34 pages with English translation.
Second Office Action of the European application No. 19840690.2, issued on Nov. 3, 2022. 6 pages.
Second Office Action of the Chinese application No. 202110396100.0, issued on Nov. 10, 2022. 23 pages with English translation.
First Office Action of the European application No. 19840690.2, issued on May 9, 2022. 6 pages.
CATT: "Consideration on 2-step RA", 3GPP Draft; R2-1700205 2-Step RA, 3rd Generation Partnership Project (3GPP), Mobile Competence Centre; 650, Route Des Lucioles F-06921 Sophia-Antipolis Cedex; France vol. RAN WG2, No. Spokane, USA; Jan. 17, 2017-Jan. 19, 2017 Jan. 17, 2017 (Jan. 17, 2017), XP051210789. 6 pages.
Supplementary European Search Report in the European application No. 19840690.2, mailed on Aug. 9, 2021. 10 pages.
Written Opinion of the International Search Authority in the international application No. PCT/CN2019/097913, mailed on Oct. 12, 2019. 9 pages.

* cited by examiner

METHOD AND DEVICE FOR INFORMATION TRANSMISSION

CROSS-REFERENCE TO RELATED APPLICATION

This application is a U.S. continuation application of International Application No. PCT/CN 2019/097913, entitled "INFORMATION TRANSMISSION METHOD AND APPARATUS, TERMINAL DEVICE, AND NETWORK DEVICE", filed on Jul. 26, 2019, which claims priority to Chinese Patent Application No. 201810844630.5, filed on Jul. 27, 2018, the contents of which are hereby incorporated by reference in their entirety.

TECHNICAL FIELD

Embodiments of the disclosure relate to the technical field of mobile communications, and particularly to a method and device for information transmission, a terminal device, and a network device.

BACKGROUND

In a $5^{th}$ Generation (5G) system, a random access channel (RACH) process adopts a 4-step process like that for long term evolution (LTE). However, a 4-step RACH process is relatively high in latency and overhead and thus is unsuitable for a low-latency and high-reliability scenario in 5G. In a new radio (NR) standardization process, considering a characteristic of a low-latency and high-reliability related service, a 2-step RACH process is proposed, and compared with the 4-step RACH process, has the advantage that the access delay may be reduced.

SUMMARY

The embodiments of the disclosure provide a method and device for information transmission.

The embodiments of the disclosure provide a method for information transmission, which includes the following operations.

A terminal device sends a first preamble and a first uplink data channel to a network device and receives first downlink control information (DCI) from the network device.

The terminal device determines at least one of the following based on a related parameter of the first DCI:
 a type of a RACH process;
 a content of the first DCI;
 a transmission mechanism for first data scheduled by the first DCI; or
 information carried in the first data scheduled by the first DCI.

The embodiments of the disclosure provide a method for information transmission, which includes the following operations.

A network device receives a first preamble and a first uplink data channel from a terminal device and sends first DCI to the terminal device, the first DCI being used for the terminal to determine at least one of the following based on a related parameter of the first DCI:
 a type of a RACH process;
 a content of the first DCI;
 a transmission mechanism for first data scheduled by the first DCI; or,
 information carried in the first data scheduled by the first DCI.

The embodiments of the disclosure provide a device for information transmission, which includes a transceiver and a processor.

The transceiver may be configured to send a first preamble and a first uplink data channel to a network device.

The transceiver may be configured to receive first DCI from the network device.

The processor may be configured to determine at least one of the following based on a related parameter of the first DCI:
 a type of a RACH process;
 a content of the first DCI;
 a transmission mechanism for first data scheduled by the first DCI; or
 information carried in the first data scheduled by the first DCI.

The embodiments of the disclosure provide a device for information transmission, which includes a transceiver.

The transceiver may be configured to receive a first preamble and first uplink data channel from a terminal device.

The transceiver may be configured to send first DCI to the terminal device, the first DCI being used for the terminal to determine, based on a related parameter of the first DCI, at least one of:
 a type of a RACH process;
 a content of the first DCI;
 a transmission mechanism for first data scheduled by the first DCI; or
 information carried in the first data scheduled by the first DCI.

DETAILED DESCRIPTION

In the related art, in the 2-step RACH process, there is a condition of fallback to the 4-step RACH process. How to determine a type of a present RACH needs to be solved. In addition, it is also necessary to determine scheduling mechanisms adopted for different types of RACH processes.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, LTE time division duplex (TDD), a universal mobile telecommunication system (UMTS), a worldwide interoperability for microwave access (WiMAX) communication system, a future 5G system, or the like.

Figure 1:
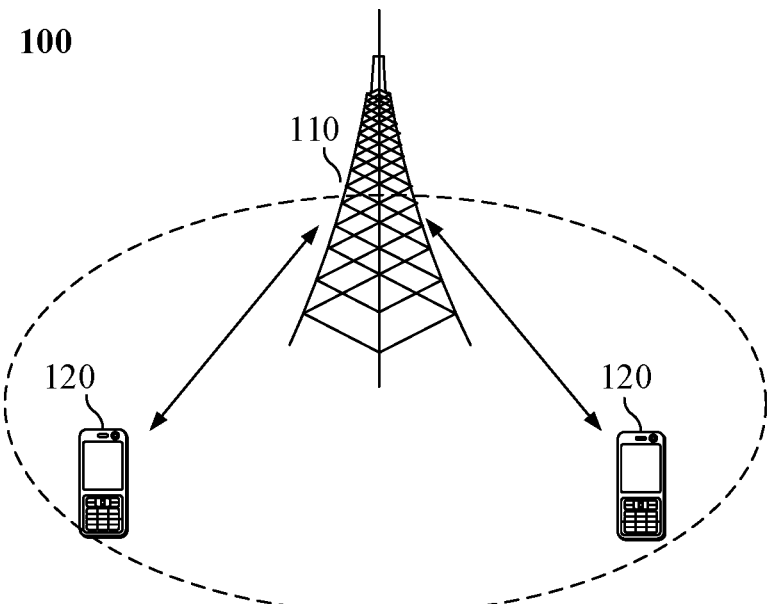
FIG. 1 is a schematic diagram of a communication system architecture according to an embodiment of the disclosure.

Exemplarily, a communication system 100 that the embodiments of the disclosure are applied to is illustrated in FIG. 1. The communication system 100 may include a network device 110, and the network device 110 may be a device communicating with a terminal device 120 (or called a communication terminal or a terminal). The network device 110 may provide communication coverage for a specific geographical region and may communicate with a terminal device located in the coverage. Optionally, the network device 110 may be a base transceiver station (BTS) in the GSM or the CDMA system, may also be a NodeB (NB) in the WCDMA system, and may further be an evolutional Node B (eNB or eNodeB) in the LTE system or a wireless controller in a cloud radio access network (CRAN). Or the network device may be a mobile switching center, a relay station, an access point, a vehicle device, a wearable device, a hub, a switch, a network bridge, a router, a network-side device in a future 5G network, a network device in a future evolved public land mobile network (PLMN) or the like.

The communication system 100 further includes at least one terminal device 120 within the coverage of the network device 110. A "terminal device" used herein includes, but is not limited to, a device arranged to receive/send a communication signal through a wired line connection, for example, through public switched telephone network (PSTN), digital subscriber line (DSL), digital cable and direct cable connections, and/or another data connection/network, and/or through a wireless interface, for example, for a cellular network, a wireless local area network (WLAN), a digital television network like a digital video broadcasting-handheld (DVB-H) network, a satellite network and an amplitude modulated (AM)-frequency modulated (FM) broadcast transmitter, and/or another communication terminal, and/or an internet of things (IoT) device. The terminal device arranged to communicate through a wireless interface may be called a "wireless communication terminal", a "wireless terminal" or a "mobile terminal." Examples of a mobile terminal include, but are not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a global positioning system (GPS) receiver, and a conventional laptop and/or palmtop receiver or another electronic device including a radio telephone transceiver. The terminal device may refer to an access terminal, user equipment (UE), a user unit, a user station, a mobile station, a mobile radio station, a remote station, a remote terminal, a mobile device, a user terminal, a terminal, a wireless terminal device, a user agent or a user device. The access terminal may be a cell phone, a cordless phone, a session initiation protocol (SIP) phone, a wireless local loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, device to device (D2D) communication may be performed between terminal devices 120.

Optionally, the 5G system or the 5G network may also be called an NR system or an NR network.

As illustrated in FIG. 1, a network device and two terminal devices are exemplarily shown. Optionally, the communication system 100 may include multiple network devices and another number of terminal devices may be included in coverage of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that a device with a communication function in the network/system in the embodiments of the disclosure may be called a terminal device. For example, for the communication system 100 illustrated in FIG. 1, terminal devices may include the network device 110 and terminal device 120 with the communication function, and the network device 110 and the terminal device 120 may be the specific devices mentioned above and will not be elaborated herein. The terminal devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For conveniently understanding the technical solutions of the embodiments of the disclosure, a 4-step RACH process and a 2-step RACH process will be described below.

Figure 2:
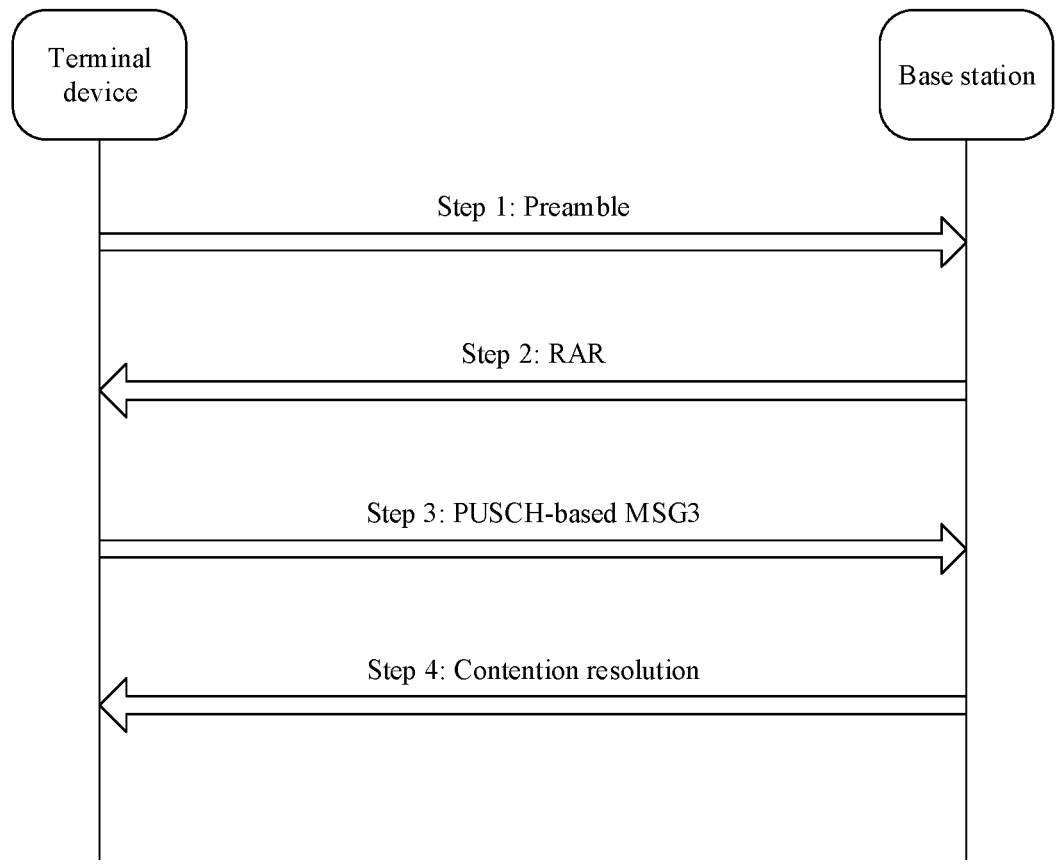
FIG. 2 is a schematic diagram of a 4-step RACH process according to an embodiment of the disclosure.

As illustrated in FIG. 2, the 4-step RACH process includes four steps as follows.

In step1, a terminal device sends a preamble (i.e., a preamble sequence) to a base station through a Message 1 (MSG1). Herein, the preamble is a randomly selected preamble.

In step2, the base station, responsive to detecting that the terminal device sends the preamble, sends a Random Access Response (RAR) to the terminal device through a Message 2 (MSG2) to notify information about an uplink resource available for sending a Message 3 (MSG3) to the terminal device, allocates a Radio Network Temporary Identity (RNTI) to the terminal device and provides a time advance command for the terminal device, etc.

In step3, the terminal device, after receiving the RAR, sends the MSG3 through the uplink resource specified by the RAR, the MSG3 containing UE-specific temporary identity information.

In step4, the base station sends a contention resolution message to the terminal device through a Message 4 (MSG4) and allocates an uplink transmission resource to the terminal device. The terminal device, after receiving the MSG4 from the base station, may detect whether the UE-specific temporary identity sent by the terminal device through the MSG3 is included in the contention resolution message sent by the base station or not. When the terminal device determines that the UE-specific temporary identity sent by the terminal device through the MSG3 is included in the contention resolution message sent by the base station, it is indicated that the RACH process of the terminal device is successful, otherwise it is determined that the RACH process fails and the terminal device needs to initiate the RACH process again from step1.

Figure 3:
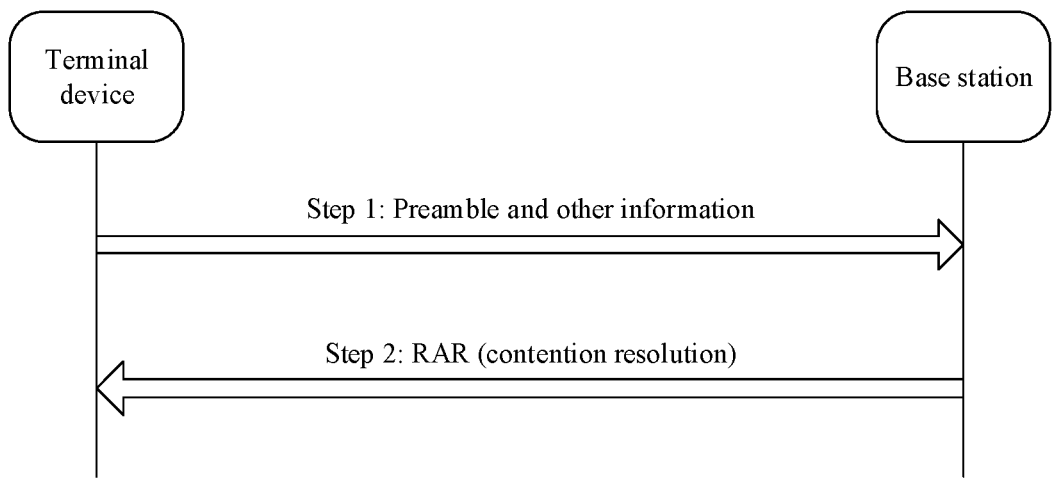
FIG. 3 is a schematic diagram of a 2-step RACH process according to an embodiment of the disclosure.

The 4-step RACH process is relatively high in delay and overhead. In an NR standardization process, considering a characteristic of a low-latency and high-reliability related service, the 2-step RACH process is proposed, and compared with the 4-step RACH process, has the advantage that the access delay may be reduced. As illustrated in FIG. 3, the 2-step RACH process includes two steps as follows.

In step1, a terminal device sends a preamble (i.e., a preamble sequence) and other information to a base station through an MSG1.

Herein, the other information may also be referred to as uplink data, which is sent through a physical uplink shared channel (PUSCH). For example, the other information may include UE-specific temporary identity information.

In step2, the base station, responsive to detecting that the terminal device sends the PUSCH, sends an RAR message and a contention resolution message to the terminal device through an MSG2.

Figure 4:
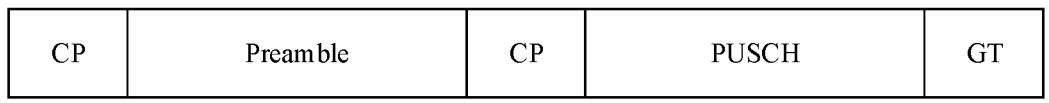
FIG. 4 is a schematic diagram of information transmitted in step1 in a 2-step RACH process according to an embodiment of the disclosure.

The 2-step RACH process is equivalent to combining step1 and step3 of the 4-step RACH process into step1 of the 2-step RACH process and combining step2 and step4 of the 4-step RACH process into step2 of the 2-step RACH process. Therefore, in step1 of 2-step RACH, the terminal device needs to send the preamble and the PUSCH. As illustrated in FIG. 4, cyclic prefixes (CPs) are set before the preamble and between the preamble and the PUSCH, and a guaranteed time (GT) is set after the PUSCH.

In the 2-step RACH process, there is a case of falling back to the 4-step RACH process. In one scenario, when a network detects a preamble and an MSG3, the 2-step RACH process is adopted, and when the network only detects the preamble, RACH falls back to the 4-step RACH process. In the embodiments of the disclosure, the 4-step RACH process and the 2-step RACH process are distinguished through a related parameter of downlink control information (DCI), and different scheduling mechanisms are adopted for the 2-step RACH process and the 4-step RACH process.

Figure 5:
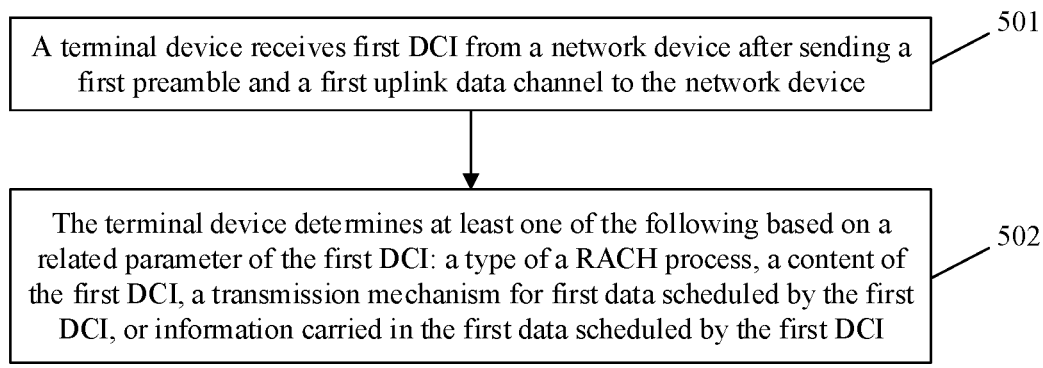
FIG. 5 is a first flowchart of a method for information transmission according to an embodiment of the disclosure.

FIG. 5 is a first flowchart of a method for information transmission according to an embodiment of the disclosure. As illustrated in FIG. 5, the method for information transmission may include the following operations.

In 501, the terminal device receives first downlink control information (DCI) from a network device after sending a first preamble and a first uplink data channel to the network device.

In the embodiment of the disclosure, the terminal device may be any device capable of communicating with the network device, such as a mobile phone, a tablet computer, a notebook computer and a vehicle terminal.

In the embodiment of the disclosure, the network device may be a base station, for example, a gNB in 5G and an eNB in LTE.

In the embodiment of the disclosure, the terminal device can perform a 2-step RACH process (referring to FIG. 3) or a 4-step RACH process (referring to FIG. 2). Herein, the 2-step RACH process is also called a first type of RACH process, and the 4-step RACH process is also called a second type of RACH process.

In an implementation, in order to reduce the delay, the terminal device needs to perform the first type of RACH process (i.e., the 2-step RACH process), and thus the terminal device is required to send the first preamble and the first uplink data channel to the network device in the first step. After sending the first preamble and the first uplink data channel, the terminal device will receive the first DCI sent by the network device. Herein, the first DCI may schedule an uplink data channel and/or a downlink data channel. For example, the first DCI includes a time-domain resource and/or frequency-domain resource of the downlink data channel, and the terminal device may receive data sent by the network device in the downlink data channel.

In an implementation, after sending the first preamble and the first uplink data channel to the network device, the terminal device receives the first DCI from the network device within a first time window. That is, the first DCI is transmitted within the first time window. For example, the terminal device completes the transmission of the first preamble and the first uplink data channel at a moment n, the first time window may be a time range from a moment n+1 to a moment n+k, and the terminal device needs to detect the first DCI in the time range from the moment n+1 to the moment n+k. If the terminal device does not detect the first DCI within the first time window, the terminal device continues to perform the RACH process without always detecting the first DCI.

In 502, the terminal device determines at least one of the following based on a related parameter of the first DCI: a type of a RACH process, a content of the first DCI, a transmission mechanism for first data scheduled by the first DCI, or information carried in the first data scheduled by the first DCI.

According to the technical solutions of the embodiments of the disclosure, the terminal device receives the first DCI from the network device after sending the first preamble and the first uplink data channel to the network device, and the terminal device determines the type of the present RACH process based on the related parameter of the first DCI, so that a 4-step RACH process and a 2-step RACH process are distinguished through the related parameter of the first DCI. In addition, the terminal device determines, based on the related parameter of the first DCI, the content of the first DCI, the transmission mechanism for the first data scheduled by the first DCI, and the information carried in the first data scheduled by the first DCI, so that different scheduling mechanisms are adopted for the 2-step RACH process and the 4-step RACH process, thereby improving the transmission efficiency In the embodiment of the disclosure, the related parameter of the first DCI includes at least one of the following:

an RNTI used for scrambling the first DCI; or a search space where the first DCI is located.

Herein, the first DCI is scrambled with the RNTI refers to that a cyclic redundancy check (CRC) bit of the first DCI is scrambled with the RNTI.

Herein, the related parameter of the first DCI may be one of the above two parameters, or may be a combination of the above two parameters. The above two parameters are explained and described below respectively.

1) The related parameter of the first DCI is the RNTI used for scrambling the first DCI.

Herein, the first DCI, when being transmitted, is required to be scrambled, and information used for scrambling the first DCI may be a certain RNTI. In an implementation manner, at least one of the following may be determined based on the RNTI used for scrambling the first DCI: the type of the RACH process, the content of the first DCI, the transmission mechanism for the first data scheduled by the first DCI, or the information carried in the first data scheduled by the first DCI, specifically as follows.

1.1) When the RNTI used for scrambling the first DCI is a first RNTI, the terminal device determines at least one of that:

the type of the RACH process is a first type of RACH process;

the content of the first DCI at least includes information used for hybrid automatic repeat request transmission;

transmission of the first data scheduled by the first DCI supports hybrid automatic repeat request transmission; or the information carried in the first data scheduled by the first DCI includes at least one of the following: contention resolution information, radio resource control (RRC) connection establishment information, or RRC connection reestablishment information.

Herein, after the terminal device receives the first DCI, when the first DCI is verified by the terminal device based on the first RNTI, it is indicated that the RNTI used for scrambling the first DCI is the first RNTI. In such case, it may be determined that a present RACH type of the terminal device is the first type of RACH process, i.e., the 2-step RACH process (referring to FIG. 3). In addition, at least one of the following may also be determined: the content of the first DCI at least includes the information used for hybrid automatic repeat request transmission; transmission of the first data scheduled by the first DCI supports hybrid automatic repeat request transmission; or, the information carried in the first data scheduled by the first DCI includes at least one of the contention resolution information, the RRC connection establishment information, or the RRC connection reestablishment information.

In the above solution, the information carried in the first data may include, but is not limited to, any information in a Message 4 (MSG4).

1.2) When the RNTI used for scrambling the first DCI is a second RNTI, the terminal device determines at least one of that:

the type of the RACH process is a second type of RACH process;

the content of the first DCI does not include the information used for hybrid automatic repeat request transmission;

transmission of the first data scheduled by the first DCI does not support hybrid automatic repeat request transmission; or information carried in the first data scheduled by the first DCI includes at least one of the following: a back indicator, a random access preamble identifier (RAPID), or a media access control (MAC) random access response (RAR).

Herein, after the terminal device receives the first DCI, when the first DCI is verified by the terminal device based on the second RNTI, it is indicated that the RNTI used for scrambling the first DCI is the second RNTI. In such case, it may be determined that the present RACH type of the terminal device is the second type of RACH process, i.e., the 4-step RACH process (referring to FIG. 2). In addition, at least one of the following may also be determined: the content of the first DCI does not include the information used for hybrid automatic repeat request transmission; transmission of the first data scheduled by the first DCI does not support hybrid automatic repeat request transmission; or, the information carried in the first data scheduled by the first DCI includes at least one of the back indicator, the RAPID, or the MAC RAR.

In the above solution, the information carried in the first data may include, but is not limited to, any information in an MSG2.

In the above solution, different acquisition manners are adopted for the first RNTI and the second RNTI. The acquisition manners for the first RNTI and the second RNTI will be described below respectively.

The first RNTI

I) In an implementation, the terminal device determines the first RNTI based on information in the first uplink data channel. Not limited thereto, the terminal device may also determine the first RNTI from other information. Furthermore, the information in the first uplink data channel includes a related parameter of the RNTI, and the related parameter of the RNTI corresponds to information of at least one RNTI or the at least one RNTI.

In an implementation, when the related parameter of the RNTI corresponds to information of one RNTI, the terminal device determines the RNTI based on the information of the RNTI and determines the RNTI as the first RNTI. For example, when the related parameter of the RNTI includes information of an RNTI 1, the terminal device directly determines the first RNTI according to the information of the RNTI 1.

In an example, when the related parameter of the RNTI corresponds to information of multiple RNTIs, the terminal device determines the multiple RNTIs based on the information of the multiple RNTIs, descrambles the first DCI with the multiple RNTIs respectively, and determines a RNTI, with which the first DCI is successfully descrambled, as the first RNTI. For example, the related parameter of the RNTI includes the information of the RNTI 1, information of an RNTI 2, information of an RNTI 3 and information of an RNTI 4, the terminal device may determine four first RNTIs and is required to verify the first DCI using the four first RNTIs respectively, and a first RNTI, based on which the first DCI is successfully verified, is the first RNTI finally determined by the terminal device.

In the above solution, the information of the RNTI includes all or partial information of the RNTI. When the information of the RNTI includes all the information of the RNTI, the terminal device determines the corresponding RNTI based on all the information of the RNTI. When the information of the RNTI includes partial information of the RNTI, the terminal device determines the first RNTI based on the partial information of the RNTI and resource information (for example, time-domain information, frequency-domain information and code-domain information) of the first preamble or the first uplink data channel.

In an example, when the related parameter of the RNTI corresponds to one RNTI, the terminal device determines the RNTI as the first RNTI.

In an example, when the related parameter of the RNTI corresponds to multiple RNTIs, the terminal device descrambles the first DCI with the multiple RNTIs respectively and determines a RNTI, with which the first DCI is successfully descrambled, as the first RNTI.

In another implementation, the information in the first uplink data channel includes at least one RNTI.

In an example, when the information in the first uplink data channel includes one RNTI, the terminal device determines the RNTI as the first RNTI. In such case, the terminal device directly sends the first RNTI to the network device through the first uplink data channel, and the network device scrambles the first DCI with the first RNTI and sends the scrambled first DCI to the terminal device. The terminal device may directly use the first RNTI to verify the first DCI.

In an example, when the information in the first uplink data channel includes multiple RNTIs, the terminal device descrambles the first DCI with the multiple RNTIs respectively and determines a RNTI, with which the first DCI is successfully descrambled, as the first RNTI.

In an implementation, before the terminal device sends the first preamble and the first uplink data channel to the network device, the terminal device receives related parameter configuration information of the RNTI. For example, the terminal device determines a value space of the first RNTI based on high-layer signaling, selects one or more first RNTIs from the value space, and sends the one or more first RNTIs to the network device through the first uplink data channel.

II) In another implementation, under the condition that the terminal device is configured with a cell-RNTI (C-RNTI), the terminal device determines the C-RNTI as the first RNTI.

The Second RNTI

The terminal device determines the second RNTI based on the resource information (for example, the time-domain information and the frequency-domain information) of the first preamble.

In the solution, the first RNTI is a UE-specific RNTI; or, the second RNTI is a UE group-specific RNTI.

Herein, the UE-specific RNTI refers to that the RNTI is configured by taking a single UE as a granularity, and each UE corresponds to an RNTI. The UE group-specific RNTI refers to that the RNTI is configured by taking a group of UEs as a granularity, and all UEs in the group of UEs correspond to an RNTI.

2) The related parameter of the first DCI is the search space where the first DCI is located.

Herein, the first DCI is carried in a downlink control channel, and the downlink control channel is transmitted in a certain search space, namely the first DCI is transmitted in the search space. In an implementation, at least one of the following may be determined based on the search space where the first DCI is located: the type of the RACH process, the content of the first DCI, the transmission mechanism for the first data scheduled by the first DCI, or the information carried in the first data scheduled by the first DCI, specifically as follows.

2.1) When the terminal device detects the first DCI in a first search space, the terminal device determines, based on the first search space, at least one of that:

the type of the RACH process is the first type of RACH process;

the content of the first DCI at least includes the information used for hybrid automatic repeat request transmission;

transmission of the first data scheduled by the first DCI supports hybrid automatic repeat request transmission; or the information carried in the first data scheduled by the first DCI includes at least one of the following: the contention resolution information, the RRC connection establishment information, or the RRC connection reestablishment information.

Herein, when the terminal device detects the first DCI in the first search space, it may be determined that the present RACH type of the terminal device is the first type of RACH process, i.e., the 2-step RACH process (referring to FIG. 3). In addition, at least one of the following may also be determined: the content of the first DCI at least includes the information used for hybrid automatic repeat request transmission; transmission of the first data scheduled by the first DCI supports hybrid automatic repeat request transmission; or the information carried in the first data scheduled by the first DCI includes at least one of the contention resolution information, the RRC connection establishment information, or the RRC connection reestablishment information.

2.2) When the terminal device detects the first DCI in a second search space, the terminal device determines, based on the second search space, at least one of that:

the type of the RACH process is the second type of RACH process;

the content of the first DCI does not include information used for hybrid automatic repeat request transmission;

transmission of the first data scheduled by the first DCI does not support hybrid automatic repeat request transmission; or the information carried in the first data scheduled by the first DCI includes at least one of the back indicator, the RAPID, or the MAC RAR.

Herein, when the terminal device detects the first DCI in the second search space, it may be determined that the present RACH type of the terminal device is the second type of RACH process, i.e., the 4-step RACH process (referring to FIG. 2). In addition, at least one of the following may also be determined: the content of the first DCI does not include information used for hybrid automatic repeat request transmission; transmission of the first data scheduled by the first DCI does not support hybrid automatic repeat request transmission; or the information carried in the first data scheduled by the first DCI includes at least one of the back indicator, the RAPID, or the MAC RAR.

In the above solution, the first search space is a UE-specific search space; or the second search space is a UE group-specific search space.

Herein, the UE-specific search space refers to that the search space is configured by taking a single UE as a granularity, and each UE corresponds to a search space. The UE group-specific search space refers to that the search space is configured by taking a group of UEs as a granularity, and all UEs in the group of UEs correspond to a search space.

In the above solution, the first search space is configured through the high-layer signaling; and/or, the second search space is configured through the high-layer signaling.

In the above solution, the first data may be, but is not limited to, downlink data.

Figure 6:
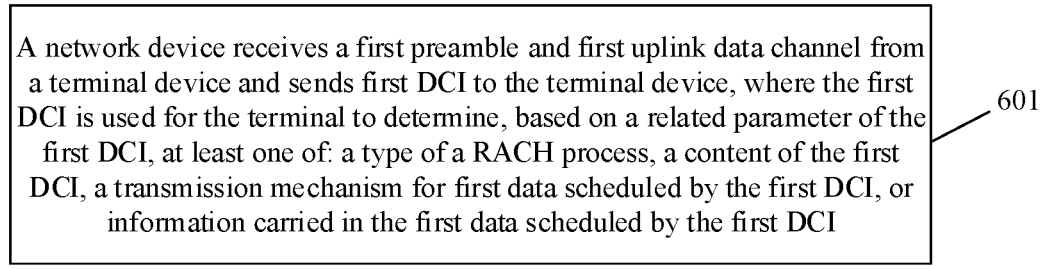
FIG. 6 is a second flowchart of a method for information transmission according to an embodiment of the disclosure.

FIG. 6 is a second flowchart of a method for information transmission according to an embodiment of the disclosure. As illustrated in FIG. 6, the method for information transmission includes the following operations.

In 601, a network device receives a first preamble and first uplink data channel from a terminal device and sends first DCI to the terminal device, where the first DCI is used for the terminal to determine, based on a related parameter of the first DCI, at least one of the following: a type of a RACH process, a content of the first DCI, a transmission mechanism for first data scheduled by the first DCI, or information carried in the first data scheduled by the first DCI.

In the embodiment of the disclosure, the network device may be a base station, such as a gNB in 5G, an eNB in LTE, and so on.

In the embodiment of the disclosure, the terminal device may be any device capable of communicating with the network device, such as a mobile phone, a tablet computer, a notebook computer and a vehicle-mounted terminal.

In the embodiment of the disclosure, the terminal device may perform a 2-step RACH process (referring to FIG. 3) or a 4-step RACH process (referring to FIG. 2). Herein, the 2-step RACH process is also called a first type of RACH process, and the 4-step RACH process is also called a second type of RACH process.

In an implementation, for reducing the delay, the terminal device needs to perform the first type of RACH process (i.e., the 2-step RACH process). For this reason, the terminal device needs to send the first preamble and the first uplink data channel to the network device in the first step. After the terminal device sends the first preamble and the first uplink data channel, the network device may send the first DCI to the terminal device. Herein, the first DCI can schedule an uplink data channel and/or a downlink data channel. For example, the first DCI includes a time-domain resource and/or frequency-domain resource of the downlink data channel, and the terminal device may receive data sent by the network device in the downlink data channel.

In an implementation, the network device, after receiving the first preamble and the first uplink data channel from the terminal device, sends the first DCI to the terminal device within a first time window. That is, the first DCI is transmitted within the first time window. For example, the network device completes the reception of the first preamble and the first uplink data channel at a moment n, the first time window may be a time range from a moment n+1 to a moment n+k, and the network device needs to send the first DCI in the time range from the moment n+1 to the moment n+k. When the terminal device cannot detect the first DCI within the first time window, the terminal device continues to perform the first type of RACH process and is not required to keep detecting the first DCI.

In the embodiment of the disclosure, the related parameter of the first DCI includes at least one of the following:

an RNTI used for scrambling the first DCI; or a search space where the first DCI is located.

Herein, the related parameter of the first DCI may be one of the above two parameters, or may be a combination of the above two parameters. The above two parameters are explained and described below respectively.

1) The related parameter of the first DCI is the RNTI used for scrambling the first DCI.

In a case that the network device receives the first preamble and the first uplink data channel, the network device scrambles the first DCI with a first RNTI. In a case that the network device receives the first preamble but does not receive the first uplink data channel, the network device scrambles the first DCI with a second RNTI.

Herein, the network device determines the first RNTI in the following manners.

A first manner: information in the first uplink data channel includes a related parameter of the RNTI, and the related parameter of the RNTI corresponds to information of at least one RNTI or the at least one RNTI, specifically as follows.

a) When the related parameter of the RNTI corresponds to information of one RNTI, the network device determines the RNTI based on the information of the RNTI and determines the RNTI as the first RNTI.

b) When the related parameter of the RNTI corresponds to information of multiple RNTIs, the network device selects information of one RNTI from the information of the multiple RNTIs and determines the first RNTI based on the information of the selected RNTI.

c) When the related parameter of the RNTI corresponds to one RNTI, the network device determines the RNTI as the first RNTI.

d) When the related parameter of the RNTI corresponds to multiple RNTIs, the network device selects one RNTI from the multiple RNTIs and determines the selected RNTI as the first RNTI.

A second manner: the information in the first uplink data channel includes at least one RNTI, specifically as follows.

A) When the information in the first uplink data channel includes one RNTI, the network device determines the RNTI as the first RNTI.

B) When the information in the first uplink data channel includes multiple RNTIs, the network device selects one RNTI from the multiple RNTIs and determines the selected RNTI as the first RNTI.

In the embodiment of the disclosure, the terminal device may determine, based on the RNTI used for scrambling the first DCI, at least one of the following: the type of the RACH process, the content of the first DCI, the transmission mechanism for the first data scheduled by the first DCI, or the information carried in the first data scheduled by the first DCI, specifically as follows.

1.1) When the RNTI used for scrambling the first DCI is a first RNTI, the terminal device determines at least one of that:

the type of the RACH process is a first type of RACH process;

the content of the first DCI at least includes information used for hybrid automatic repeat request transmission;

transmission of the first data scheduled by the first DCI supports hybrid automatic repeat request transmission; or the information carried in the first data scheduled by the first DCI includes at least one of contention resolution information, RRC connection establishment information, or RRC connection reestablishment information.

Herein, after the terminal device receives the first DCI, if the first DCI is verified by the terminal device based on the first RNTI, it is indicated that the RNTI used for scrambling the first DCI is the first RNTI. In such case, it may be determined that a present RACH type of the terminal device is the first type of RACH process, i.e., the 2-step RACH process (referring to FIG. 3). In addition, at least one of the following may also be determined: the content of the first DCI at least includes the information used for hybrid automatic repeat request transmission; transmission of the first data scheduled by the first DCI supports hybrid automatic repeat request transmission; or, the information carried in the first data scheduled by the first DCI includes at least one of the contention resolution information, the RRC connection establishment information, or the RRC connection reestablishment information.

In the solution, the information carried in the first data may include, but is not limited to, any information in an MSG4.

1.2) When the RNTI used for scrambling the first DCI is a second RNTI, the terminal device determines at least one of that:

the type of the RACH process is the second type of RACH process;

the content of the first DCI does not include the information used for hybrid automatic repeat request transmission;

transmission of the first data scheduled by the first DCI does not support hybrid automatic repeat request transmission; or information carried in the first data scheduled by the first DCI includes at least one of the following: a back indicator, a RAPID, or a MAC RAR.

Herein, after the terminal device receives the first DCI, if the first DCI is verified by the terminal device based on the second RNTI, it is indicated that the RNTI used for scrambling the first DCI is the second RNTI. In such case, it may be determined that the present RACH type of the terminal device is the second type of RACH process, i.e., the 4-step RACH process (referring to FIG. 2). In addition, at least one of the following may also be determined: the content of the first DCI does not include the information used for hybrid automatic repeat request transmission; transmission of the first data scheduled by the first DCI does not support hybrid automatic repeat request transmission; or the information carried in the first data scheduled by the first DCI includes at least one of the back indicator, the RAPID, or the MAC RAR.

In the above solution, the information contained in the first data may include, but is not limited to, any information in an MSG2.

In the solution, different acquisition manners are adopted for the first RNTI and the second RNTI. The acquisition manners for the first RNTI and the second RNTI will be described below respectively.

2) The related parameter of the first DCI is the search space where the first DCI is located.

Herein, the first DCI is carried in a downlink control channel, and the downlink control channel is transmitted in a certain search space, namely the first DCI is transmitted in the search space.

Under the condition that the network device receives the first preamble and the first uplink data channel, the network device sends the first DCI in a first search space. Under the condition that the network device receives the first preamble but does not receive the first uplink data channel, the network device sends the first DCI in a second search space.

In the embodiment of the disclosure, the terminal device may determine, based on the search space where the first DCI is located, at least one of the following: the type of the RACH process, the content of the first DCI, the transmission mechanism for the first data scheduled by the first DC, or the information carried in the first data scheduled by the first DCI, specifically as follows.

2.1) When the terminal device detects the first DCI in a first search space, the terminal device determines, based on the first search space, at least one of that:

the type of the RACH process is the first type of RACH process;

the content of the first DCI at least includes the information used for hybrid automatic repeat request transmission;

transmission of the first data scheduled by the first DCI supports hybrid automatic repeat request transmission; or the information carried in the first data scheduled by the first DCI includes at least one of the following: the contention resolution information, the RRC connection establishment information, or the RRC connection reestablishment information.

Herein, when the terminal device detects the first DCI in the first search space, it may be determined that the present RACH type of the terminal device is the first type of RACH process, i.e., the 2-step RACH process (referring to FIG. 3). In addition, at least one of the following may also be determined: the content of the first DCI at least includes the information used for hybrid automatic repeat request transmission; transmission of the first data scheduled by the first DCI supports hybrid automatic repeat request transmission; or the information carried in the first data scheduled by the first DCI includes at least one of the contention resolution information, the RRC connection establishment information, or the RRC connection reestablishment information.

2.2) When the terminal device detects the first DCI in a second search space, the terminal device determines, based on the second search space, at least one of that:

the type of the RACH process is the second type of RACH process;

the content of the first DCI does not include the information used for hybrid automatic repeat request transmission;

transmission of the first data scheduled by the first DCI does not support hybrid automatic repeat request transmission; or the information carried in the first data scheduled by the first DCI includes at least one of the back indicator, the RAPID, or the MAC RAR.

Herein, when the terminal device detects the first DCI in the second search space, it may be determined that the present RACH type of the terminal device is the second type of RACH process, i.e., the 4-step RACH process (referring to FIG. 2). In addition, at least one of the following may also be determined: the content of the first DCI does not include the information used for hybrid automatic repeat request transmission; transmission of the first data scheduled by the first DCI does not support hybrid automatic repeat request transmission; or the information carried in the first data scheduled by the first DCI includes at least one of the back indicator, the RAPID, or the MAC RAR.

In the above solution, the first search space is a UE-specific search space; or the second search space is a UE group-specific search space.

Herein, the UE-specific search space refers to that the search space is configured by taking a single UE as a granularity and each UE corresponds to a search space. The UE group-specific search space refers to that the search space is configured by taking a group of UEs as a granularity, and all UEs in the group of UEs correspond to a search space.

In the above solution, the first search space is configured through the high-layer signaling; and/or, the second search space is configured through the high-layer signaling.

Figure 7:
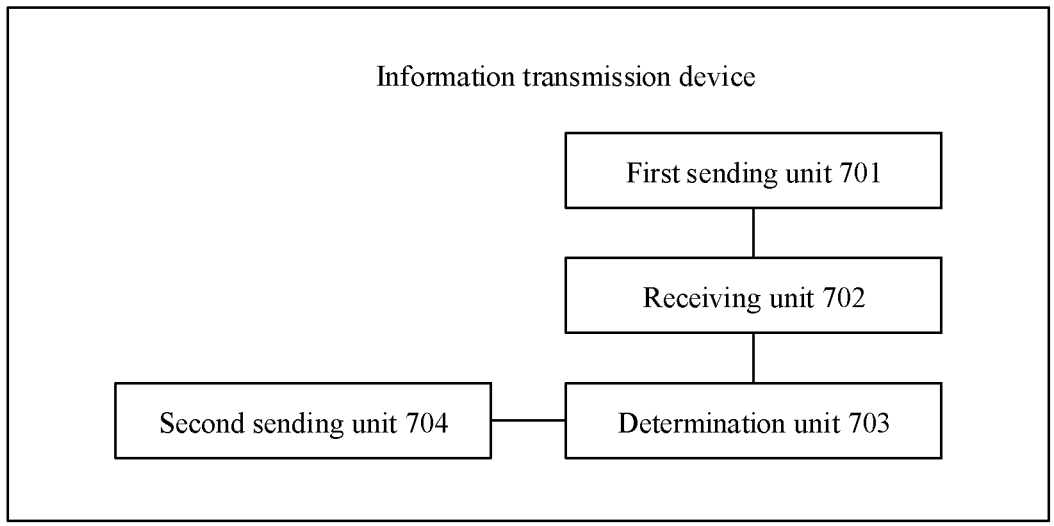
FIG. 7 is a first structure composition diagram of a device for information transmission according to an embodiment of the disclosure.

FIG. 7 is a first structure composition diagram of a device for information transmission according to an embodiment of the disclosure. As illustrated in FIG. 7, the device for information transmission includes a first sending unit 701, a receiving unit 702 and a determination unit 703.

The first sending unit 701 is configured to send a first preamble and a first uplink data channel to a network device.

The receiving unit 702 is configured to receive first DCI from the network device.

The determination unit 703 is configured to determine at least one of the following based on a related parameter of the first DCI:

a type of a RACH process;

a content of the first DCI;

a transmission mechanism for first data scheduled by the first DCI; or information carried in the first data scheduled by the first DCI.

In an implementation, the related parameter of the first DCI includes at least one of:

an RNTI used for scrambling the first DCI; or a search space where the first DCI is located.

In an implementation, when the RNTI used for scrambling the first DCI is a first RNTI, the determination unit 703 determines at least one of that:

the type of the RACH process is a first type of RACH process;

the content of the first DCI at least includes information used for hybrid automatic repeat request transmission;

transmission of the first data scheduled by the first DCI supports hybrid automatic repeat request transmission; or the information carried in the first data scheduled by the first DCI includes at least one of the following: contention resolution information, RRC connection establishment information, or RRC connection reestablishment information.

In an implementation, the determination unit 703 is further configured to determine the first RNTI based on information in the first uplink data channel.

In an implementation, the information in the first uplink data channel includes a related parameter of the RNTI, and the related parameter of the RNTI corresponds to information of at least one RNTI or the at least one RNTI.

In an implementation, when the related parameter of the RNTI corresponds to information of one RNTI, the determination unit 703 determines the RNTI based on the information of the RNTI and determines the RNTI as the first RNTI.

Or, when the related parameter of the RNTI corresponds to information of multiple RNTIs, and the determination unit 703 determines the multiple RNTIs based on the information of the multiple RNTIs, descrambles the first DCI with the multiple RNTIs respectively, and determines a RNTI, with which the first DCI is successfully descrambled, as the first RNTI.

In an implementation, the information of the RNTI may include all or partial information of the RNTI.

When the information of the RNTI includes all the information of the RNTI, the determination unit 703 determines the corresponding RNTI based on all the information of the RNTI.

When the information of the RNTI includes partial information of the RNTI, the determination unit 703 determines the corresponding RNTI based on the partial information of the RNTI and resource information of the first preamble or the first uplink data channel.

In an implementation, when the related parameter of the RNTI corresponds to one RNTI, the determination unit 703 determines the RNTI as the first RNTI.

Or, when the related parameter of the RNTI corresponds to multiple RNTIs, the determination unit 703 descrambles the first DCI with the multiple RNTIs respectively, and determines a RNTI, with which the first DCI is successfully descrambled, as the first RNTI.

In an implementation, the information in the first uplink data channel includes at least one RNTI.

In an implementation, when the information in the first uplink data channel includes one RNTI, the determination unit 703 determines the RNTI as the first RNTI; or, when the information in the first uplink data channel includes multiple RNTIs, the determination unit 703 descrambles the first DCI with the multiple RNTIs respectively, and determines a RNTI, with which the first DCI is successfully descrambled, as the first RNTI.

In an implementation, the device further includes a second sending unit 704.

The second sending unit 704 is configured to receive related parameter configuration information of the RNTI before the first sending unit sends the first preamble and the first uplink data channel.

In an implementation, under the condition that a terminal device is configured with a C-RNTI, the determination unit 703 determines the C-RNTI as the first RNTI.

In an implementation, when the RNTI used for scrambling the first DCI is a second RNTI, the determination unit 703 determines at least one of that:

the type of the RACH process is a second type of RACH process;

the content of the first DCI does not include the information used for hybrid automatic repeat request transmission;

transmission of the first data scheduled by the first DCI does not support hybrid automatic repeat request transmission; or the information carried in the first data scheduled by the first DCI includes at least one of a back indicator, a RAPID, or a MAC RAR.

In an implementation, the determination unit 703 is further configured to determine the second RNTI based on the resource information of the first preamble.

In an implementation, the first RNTI is a UE-specific RNTI; or, the second RNTI is a UE group-specific RNTI.

In an implementation, when the terminal device detects the first DCI in a first search space, the determination unit 703 determines, based on the first search space, at least one of that:

the type of the RACH process is the first type of RACH process;

the content of the first DCI at least includes the information used for hybrid automatic repeat request transmission;

transmission of the first data scheduled by the first DCI supports hybrid automatic repeat request transmission; or the information carried in the first data scheduled by the first DCI includes at least one of the following: the contention resolution information, the RRC connection establishment information, or the RRC connection reestablishment information.

In an implementation, when the terminal device detects the first DCI in a second search space, the determination unit 703 determines, based on the second search space, at least one of that:

the type of the RACH process is the second type of RACH process;

the content of the first DCI does not include the information used for hybrid automatic repeat request transmission;

transmission of the first data scheduled by the first DCI does not support hybrid automatic repeat request transmission; or the information carried in the first data scheduled by the first DCI includes at least one of the back indicator, the RAPID, or the MAC RAR.

In an implementation, the first search space is a UE-specific search space; or, the second search space is a UE group-specific search space.

In an implementation, the first search space is configured through high-layer signaling; and/or, the second search space is configured through the high-layer signaling.

In an implementation, the receiving unit 702 is configured to receive the first

DCI sent by the network device within a first time window.

In the above solution, the first type of RACH process is a 2-step RACH process. The second type of RACH process is a 4-step RACH process.

It is understood by those skilled in the art that the related descriptions about the device for information transmission of the embodiments of the disclosure may be understood with reference to the related descriptions about the method for information transmission of the embodiments of the disclosure.

Figure 8:
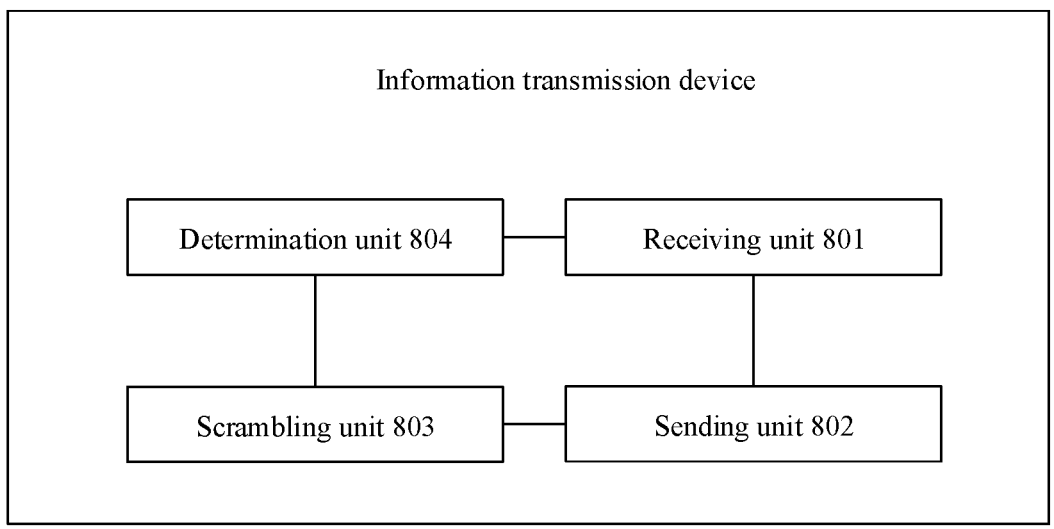
FIG. 8 is a second structure composition diagram of a device for information transmission according to an embodiment of the disclosure.

FIG. 8 is a second structure composition diagram of a device for information transmission according to an embodiment of the disclosure. As illustrated in FIG. 8, the device includes a receiving unit 801 and a sending unit 802.

The receiving unit 801 is configured to receive a first preamble and first uplink data channel from a terminal device.

The sending unit 802 is configured to send first DCI to the terminal device, the first DCI being used for the terminal to determine at least one of the following based on a related parameter of the first DCI:

a type of a RACH process;

a content of the first DCI;

a transmission mechanism for first data scheduled by the first DCI; or information carried in the first data scheduled by the first DCI.

In an implementation, the related parameter of the first DCI includes at least one of:

an RNTI used for scrambling the first DCI; or a search space where the first DCI is located.

In an implementation, the device further includes a scrambling unit 803.

When the receiving unit 801 receives the first preamble and the first uplink data channel, the scrambling unit 803 scrambles the first DCI with a first RNTI.

When the receiving unit 801 receives the first preamble but does not receive the first uplink data channel, the scrambling unit 803 scrambles the first DCI by use of a second RNTI.

In an implementation, information in the first uplink data channel includes a related parameter of the RNTI, and the related parameter of the RNTI corresponds to information of at least one RNTI or the at least one RNTI.

In an implementation, the device further includes a determination unit 804.

When the related parameter of the RNTI corresponds to information of one RNTI, the determination unit 804 determines the RNTI based on the information of the RNTI and determines the RNTI as the first RNTI; or, when the related parameter of the RNTI corresponds to information of multiple RNTIs, the determination unit 804 selects information of one RNTI from the information of the multiple RNTIs and determines the first RNTI based on the information of the selected RNTI; or, when the related parameter of the RNTI corresponds to one RNTI, the determination unit 804 determines the RNTI as the first RNTI; or, when the related parameter of the RNTI corresponds to multiple RNTIs, the determination unit 804 selects one RNTI from the multiple RNTIs and determines the selected RNTI as the first RNTI.

In an implementation, the information in the first uplink data channel includes at least one RNTI.

In an implementation, the device further includes the determination unit 804.

When the information in the first uplink data channel includes one RNTI, the determination unit 804 determines the RNTI as the first RNTI; or, when the information in the first uplink data channel includes multiple RNTIs, the determination unit 804 selects one RNTI from the multiple RNTIs and determines the selected RNTI as the first RNTI.

In an implementation, when the receiving unit 801 receives the first preamble and the first uplink data channel, the sending unit 802 sends the first DCI in a first search space.

When the receiving unit 801 receives the first preamble but does not receive the first uplink data channel, the sending unit 802 sends the first DCI in a second search space.

In an implementation, the sending unit 802 is configured to send the first DCI to the terminal device within a first time window.

It is understood by those skilled in the art that the related descriptions about the device for information transmission of the embodiments of the disclosure may be understood with reference to the related descriptions about the method for information transmission of the embodiments of the disclosure.

Figure 9:
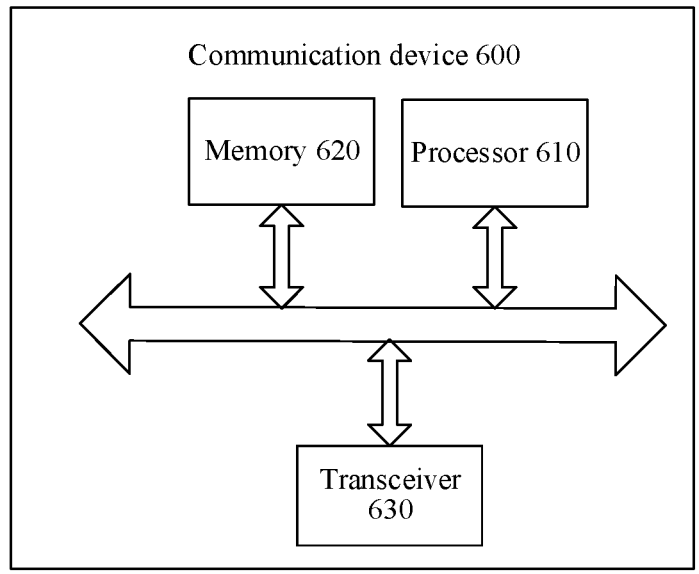
FIG. 9 is a schematic structure diagram of a communication device according to an embodiment of the disclosure.

FIG. 9 is a schematic structure diagram of a communication device 600 according to an embodiment of the disclosure. The communication device 600 is a terminal device or a network device. The communication device illustrated in FIG. 9 includes a processor 610, and the processor 610 may call and run a computer program in a memory to perform the method for information transmission in the embodiments of the disclosure.

Optionally, as illustrated in FIG. 9, the communication device 600 may further include the memory 620. The processor 610 may call and run the computer program in the memory 620 to perform the method for information transmission in the embodiments of the disclosure.

The memory 620 may be a separate device independent of the processor 610, or may be integrated into the processor 610.

Optionally, as illustrated in FIG. 9, the communication device 600 may further include a transceiver 630, and the processor 610 may control the transceiver 630 to communicate with another device, specifically sending information or data to the another device or receiving information or data from the another device.

The transceiver 630 may include a transmitter and a receiver. The transceiver 630 may further include antennae, and the number of the antennae may be one or more.

Optionally, the communication device 600 may specifically be a network device of the embodiment of the disclosure, and the communication device 600 may implement corresponding flows implemented by the network device in each method of the embodiments of the disclosure. For simplicity, elaborations are omitted herein.

Optionally, the communication device 600 may specifically be the mobile terminal/terminal device of the embodiments of the disclosure, and the communication device 600 may implement corresponding flows implemented by the mobile terminal/terminal device in each method of the embodiments of the disclosure. For simplicity, elaborations are omitted herein.

Figure 10:
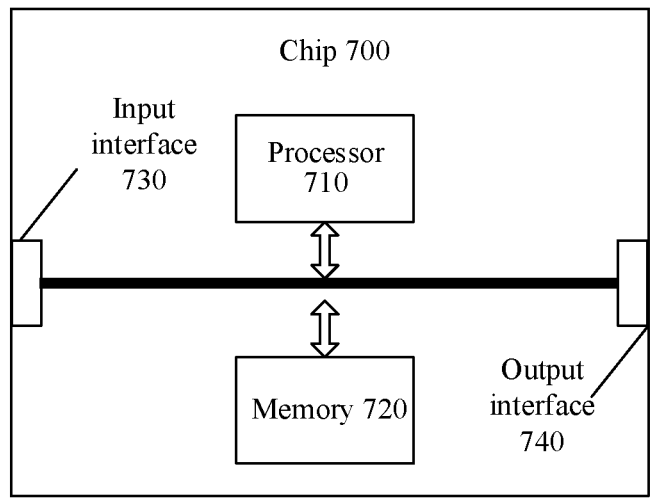
FIG. 10 is a schematic structure diagram of a chip according to an embodiment of the disclosure.

FIG. 10 is a schematic structure diagram of a chip according to an embodiment of the disclosure. The chip 700 illustrated in FIG. 10 includes a processor 710, and the processor 710 may call and run a computer program in a memory to perform the method for information transmission in the embodiments of the disclosure.

Optionally, as illustrated in FIG. 10, the chip 700 may further include the memory 720. The processor 710 may call and run the computer program in the memory 720 to perform the method for information transmission in the embodiments of the disclosure.

The memory 720 may be a separate device independent of the processor 710, or may be integrated into the processor 710.

Optionally, the chip 700 may further include an input interface 730. The processor 710 may control the input interface 730 to communicate with another device or chip, specifically acquiring information or data from the another device or chip.

Optionally, the chip 700 may further include an output interface 740. The processor 710 may control the output interface 740 to communicate with the another device or chip, specifically outputting information or data to the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal device of the embodiment of the disclosure, and the chip may implement corresponding flows implemented by the mobile terminal/terminal device in each method of the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 11:
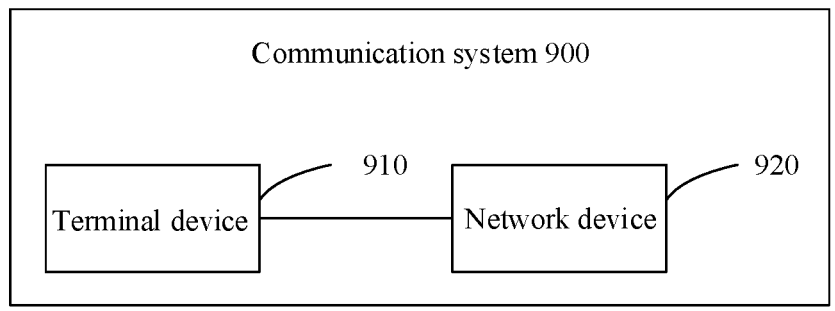
FIG. 11 is a schematic block diagram of a communication system according to an embodiment of the disclosure.

FIG. 11 is a block diagram of a communication system 900 according to an embodiment of the disclosure. As illustrated in FIG. 9, a communication system 900 includes a terminal device 910 and a network device 920.

The terminal device 910 may be configured to implement corresponding functions implemented by the terminal device in the above method, and the network device 920 may be configured to implement corresponding functions implemented by the network device in the method. For simplicity, elaborations are omitted herein.

It is to be understood that the processor in the embodiment of the disclosure may be an integrated circuit chip with a signal processing capacity. In an implementation process, the steps of the foregoing method embodiments may be completed by an integrated logical circuit of hardware in the processor or instructions in a software form. The processor may be a universal processor, a digital signal processor (DSP), an application specific integrated circuit (ASIC), a field programmable gate array (FPGA) or another programmable logical device, discrete gate or transistor logical device and discrete hardware component. The methods, steps and logical block diagrams disclosed in the embodiments of the disclosure can be implemented or executed. The universal processor may be a microprocessor or the processor may also be any conventional processor or the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in the field, such as a random access memory (RAM), a flash memory, a read-only memory (ROM), a programmable ROM (PROM), electrically erasable PROM (EEPROM), or a register. The storage medium is located in a memory, and the processor reads information from the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an erasable PROM (EPROM), an EEPROM or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct Rambus RAM (DR RAM). It is to be noted that the memory of a system and method described in the disclosure is intended to include, but is not limited to, memories of these and any other suitable types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM.

That is, the memory in the embodiments of the disclosure is intended to include, but is not limited to, memories of these and any other suitable types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes one or more computer program instructions.

Optionally, the computer program product may be applied to a network device in the embodiments of the disclosure, and the one or more computer program instructions enable a computer to execute corresponding operations implemented by the network device in each method of the embodiments of the disclosure. For simplicity, elaborations are omitted herein.

Optionally, the computer program product may be applied to a mobile terminal/terminal device in the embodiments of the disclosure, and the one or more computer program instructions enable the computer to execute corresponding operations implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding operations implemented by the mobile terminal/terminal device in each method of the embodiments of the disclosure. For simplicity, elaborations are omitted herein.

Those of ordinary skill in the art may realize that the units and algorithm steps of each example described in combination with the embodiments of the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information transmission, comprising:
receiving, by a terminal device, first downlink control information (DCI) from a network device after the terminal device has sent a first preamble and a first uplink data channel to the network device; and
determining, by the terminal device, the following based on a radio network temporary identity (RNTI) used for scrambling the first DCI:
a type of a random access channel (RACH) process, including a 2-step RACH process and a 4-step RACH process;
a content of the first DCI;
a transmission mechanism for first data scheduled by the first DCI; and
information carried in the first data scheduled by the first DCI,
wherein, when the RNTI used for scrambling the first DCI is a first RNTI, the terminal device determines:
the type of the RACH process is the 2-step RACH process;
the content of the first DCI at least comprises information used for hybrid automatic repeat request transmission;
transmission of the first data scheduled by the first DCI supports hybrid automatic repeat request transmission; and
the information carried in the first data scheduled by the first DCI comprises at least one of the following: contention resolution information, radio resource control (RRC) connection establishment information, or RRC connection reestablishment information, and
wherein, when the RNTI used for scrambling the first DCI is a second RNTI, the terminal device determines:
the type of the RACH process is the 4-step RACH process;
the content of the first DCI does not comprise information used for hybrid automatic repeat request transmission;
transmission of the first data scheduled by the first DCI does not support hybrid automatic repeat request transmission; and
the information carried in the first data scheduled by the first DCI comprises at least one of a back indicator, a random access preamble identifier (RAPID), or a media access control (MAC) random access response (RAR).

2. The method of claim 1, further comprising:
determining, by the terminal device, the first RNTI based on information in the first uplink data channel.

3. The method of claim 2, wherein the information in the first uplink data channel comprises at least one RNTI.

4. The method of claim 3, wherein
when the information in the first uplink data channel comprises one RNTI, the terminal device determines the RNTI as the first RNTI; or
when the information in the first uplink data channel comprises multiple RNTIs, the terminal device descrambles the first DCI with the multiple RNTIs respectively and determines the RNTI, with which the first DCI is successfully descrambled, as the first RNTI.

5. The method of claim 1, further comprising:
determining, by the terminal device, the second RNTI based on resource information of the first preamble.

6. A method for information transmission, comprising:
receiving, by a network device, a first preamble and a first uplink data channel from a terminal device; and
sending, by the network device, first downlink control information (DCI) to the terminal device,
wherein the first DCI is used for the terminal device to determine, based on a radio network temporary identity (RNTI) used for scrambling the first DCI, the following:
a type of a random access channel (RACH) process, including a 2-step RACH process and a 4-step RACH process;
a content of the first DCI;
a transmission mechanism for first data scheduled by the first DCI; and
information carried in the first data scheduled by the first DCI,
wherein, when the RNTI used for scrambling the first DCI is a first RNTI, the first DCI is used for the terminal device to determine, based on the first RNTI, the following:
the type of the RACH process is the 2-step RACH process;
the content of the first DCI at least comprises information used for hybrid automatic repeat request transmission;
transmission of the first data scheduled by the first DCI supports hybrid automatic repeat request transmission; and
the information carried in the first data scheduled by the first DCI comprises at least one of the following: contention resolution information, radio resource control (RRC) connection establishment information, or RRC connection reestablishment information, and
wherein, when the RNTI used for scrambling the first DCI is a second RNTI, the first DCI is used for the terminal device to determine, based on the second RNTI, the following:
the type of the RACH process is the 4-step RACH process;
the content of the first DCI does not comprise information used for hybrid automatic repeat request transmission;
transmission of the first data scheduled by the first DCI does not support hybrid automatic repeat request transmission; and
the information carried in the first data scheduled by the first DCI comprises at least one of a back indicator, a random access preamble identifier (RAPID), or a media access control (MAC) random access response (RAR).

7. The method of claim 6, wherein
when the network device receives the first preamble and the first uplink data channel, the network device scrambles the first DCI with the first RNTI; or
when the network device receives the first preamble but does not receive the first uplink data channel, the network device scrambles the first DCI with the second RNTI.

8. The method of claim 7, wherein information in the first uplink data channel comprises a related parameter of a RNTI, the related parameter of the RNTI corresponding to information of at least one RNTI or the at least one RNTI.

9. A device for information transmission, comprising:
a processor; and
a transceiver;
wherein the transceiver is configured to receive first downlink control information (DCI) from a network device after sending a first preamble and a first uplink data channel to the network device; and
the processor is configured to determine, based on a radio network temporary identity (RNTI) used for scrambling the first DCI, the following:
a type of a random access channel (RACH) process, including a 2-step RACH process and a 4-step RACH process;
a content of the first DCI;
a transmission mechanism for first data scheduled by the first DCI; and
information carried in the first data scheduled by the first DCI
wherein, when the RNTI used for scrambling the first DCI is a first RNTI, the processor determines:
the type of the RACH process is the 2-step RACH process;
the content of the first DCI at least comprises information used for hybrid automatic repeat request transmission;
transmission of the first data scheduled by the first DCI supports hybrid automatic repeat request transmission; and
the information carried in the first data scheduled by the first DCI comprises at least one of the following: contention resolution information, radio resource control (RRC) connection establishment information, or RRC connection reestablishment information, and
wherein, when the RNTI used for scrambling the first DCI is a second RNTI, the processor determines:
the type of the RACH process is the 4-step RACH process;
the content of the first DCI does not comprise information used for hybrid automatic repeat request transmission;
transmission of the first data scheduled by the first DCI does not support hybrid automatic repeat request transmission; and
the information carried in the first data scheduled by the first DCI comprises at least one of a back indicator, a random access preamble identifier (RAPID), or a media access control MAC) random access response (RAR).

10. The device of claim 9, wherein the processor is further configured to determine the first RNTI based on information in the first uplink data channel.

11. A device for information transmission, comprising a transceiver, wherein the transceiver is configured to:
receive a first preamble and a first uplink data channel from a terminal device; and
send first downlink control information (DCI) to the terminal device,
wherein the first DCI is used for the terminal device to determine, based on a radio network temporary identity (RNTI) used for scrambling the first DCI, the following:
a type of a random access channel (RACH) process, including a 2-step RACH process and a 4-step RACH process;
a content of the first DCI;
a transmission mechanism for first data scheduled by the first DCI; and
information carried in the first data scheduled by the first DCI, wherein, when the RNTI used for scrambling the first DCI is a first RNTI, the first DCI is used for the terminal device to determine, based on the first RNTI, the following:

the type of the RACH process is the 2-step RACH process;

the content of the first DCI at least comprises information used for hybrid automatic repeat request transmission;

transmission of the first data scheduled by the first DCI supports hybrid automatic repeat request transmission; and the information carried in the first data scheduled by the first DCI comprises at least one of the following: contention resolution information, radio resource control (RRC) connection establishment information, or RRC connection reestablishment information, and wherein, when the RNTI used for scrambling the first DCI is a second RNTI, the first DCI is used for the terminal device to determine, based on the second RNTI, the following:

the type of the RACH process is the 4-step RACH process;

the content of the first DCI does not comprise information used for hybrid automatic repeat request transmission;

transmission of the first data scheduled by the first DCI does not support hybrid automatic repeat request transmission; and the information carried in the first data scheduled by the first DCI comprises at least one of a back indicator, a random access preamble identifier (RAPID), or a media access control (MAC) random access response (RAR).

12. The device of claim 11, wherein the device further comprises a processor, configured to:

scramble the first DCI with the first RNTI when the transceiver receives the first preamble and the first uplink data channel; or scramble the first DCI with the second RNTI when the transceiver receives the first preamble but does not receive the first uplink data channel.

13. The device of claim 12, wherein information in the first uplink data channel comprises a related parameter of a RNTI, the related parameter of the RNTI corresponding to information of at least one RNTI or the at least one RNTI.

* * * * *